March 30, 1937.  W. K. PORTEOUS  2,075,224
SEWAGE DISPOSAL
Filed April 27, 1935
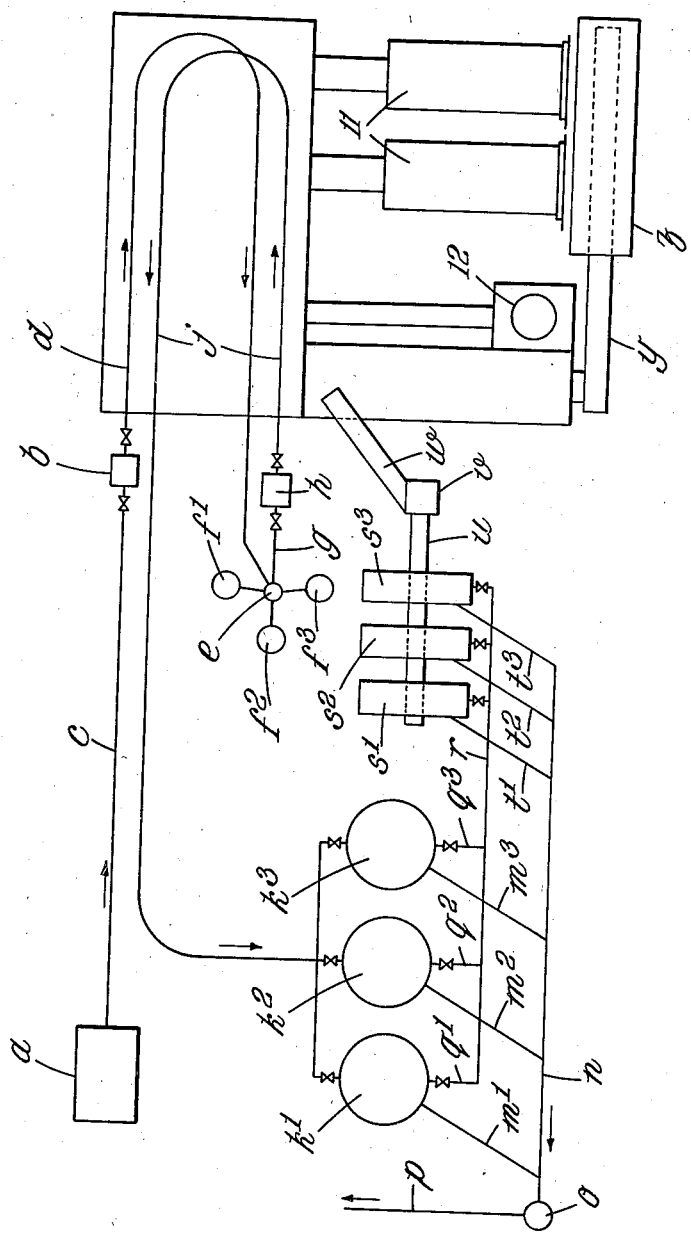
INVENTOR
WILLIAM K. PORTEOUS
BY
ATTORNEY.

Patented Mar. 30, 1937

2,075,224

UNITED STATES PATENT OFFICE 2,075,224

SEWAGE DISPOSAL

William King Porteous, St. Margaret's Twickenham, England, assignor of fifteen per cent to William Thomas Towler, London, England Application April 27, 1935, Serial No. 18,703
In Great Britain February 28, 1935

1 Claim. (Cl. 210—2)

Various systems of sewage disposal are known and practised which, generally, do not present any difficult problem as regards the running away of the effluent, but often the disposal of the residual sludge is a very serious matter which sometimes involves considerable expense in transporting and dumping it, at sea or elsewhere. To overcome that drawback it has been proposed to treat the sludge by a so-called wet carbonizing process which renders it suitable for filtration, in ordinary filter presses, the resultant solid matter removed from the filter presses being suitable for use as a fertilizer.

The primary object of the present invention is to prevent undue clogging of sludge filters whilst a further object is to reduce the cost of fuel, thus reducing the expense of operating the process.

In accordance with the improved process sewage sludge is heated under pressure, partially cooled in a heat recuperator, passed to a settling tank from which supernatant liquid is subsequently decanted, the residue being subjected to the action of a mixer whereby the suspended fibrous material is distributed throughout the mass of fine material, after which the solid matter in said residue is separated from the liquid content by means of a suitable filtering device.

The solid matter thus separated from said residue may then be consumed in an incinerator which, preferably, is the furnace which constitutes the source of heat for the treatment of the sludge under pressure, and, if desired, the cakes of solid residue taken from the filtering device may be introduced into a heated chamber or other device for the removal therefrom of some of its moisture content before it is used as fuel in the furnace. In some cases, however, the dried cakes of solid residue may be ground to a powder for use as a fertilizer.

Preferably the heating of the sludge under pressure is effected by means of steam at a pressure of about 100 lbs. per square inch.

It has been found that if this heated and partially cooled sewage be allowed to stand in a settling tank, the humus and other fine particles tend to sink to the bottom, the fibrous material remaining at a higher level, whilst at the highest levels there is liquid which has separated out and which is practically clear of solids in suspension.

This liquid is decanted according to the present invention and the residue is subjected to the action of any convenient form of mixing or stirring device so that the fine particles and fibrous matter are thoroughly intermingled, for it has been found that otherwise the filtering device through which the residue is to be passed will become clogged rapidly by the humus or other fine particles, whilst the intermingling produced by the mixing or stirring device causes said residue to pass to the filter in such a condition that the fibrous material builds up on the filter cloth as a foundation or superstructure which holds the fine material without such loss of porosity as to prevent the passage of liquid.

The invention is illustrated by way of example in the accompanying diagrammatic drawing.

As shown, sludge from a sludge pit $a$ is sucked by a pump $b$ through a pipe $c$ and delivered through a pipe $d$, forming part of a recuperator, to a valve $e$ through which it passes to one, say $f^1$, of a battery of receptacles $f^1$, $f^2$, $f^3$ (three are shown in the present example), whilst sludge from another of said receptacles, say $f^2$, is drawn through the valve $e$ and a pipe $g$ by a second pump $h$ and delivered through a pipe $j$ forming part of said recuperator to any selected one, say $k^1$, of a battery of settling tanks $k^1$, $k^2$, $k^3$ (three are shown in the present example) from which supernatant liquid may be decanted subsequently by the appropriate pipe $m^1$, $m^2$ or $m^3$, connected with a pipe $n$ leading to a boiler feed water heater $o$ and thence away by a pipe $p$.

The valve $e$ is so arranged that whilst one receptacle, say $f^1$, is being charged by means of the pump $b$, with sludge which has passed through the pipe $d$ of the recuperator, where it takes up heat, another, say $f^2$, is being emptied by the pump $h$ through the pipe $j$ of the recuperator, where it gives out heat before passing to the settling tank $k^1$, $k^2$ or $k^3$, and the sludge in the third receptacle, say $f^3$, is undergoing heat treatment with high pressure steam from the boilers 11, it being understood that said third receptacle, say $f^3$, was charged with sludge whilst a receptacle, say $f^1$, was being emptied, and sludge in the third receptacle, say $f^2$, was undergoing heat treatment.

In each of the settling tanks $k^1$, $k^2$ and $k^3$ is a mixing device of any suitable kind (not shown) to the action of which the residue may be subjected after the supernatant liquid has been decanted, said residue being then passed by the appropriate pipe $q^1$, $q^2$ or $q^3$ connected with a pipe $r$ to one of a battery of filter presses $s^1$, $s^2$, $s^3$ (three are shown in the present example), the liquid content expressed by the filter being conveyed away by the appropriate pipe $t^1$, $t^2$ or $t^3$ to the pipe $n$, boiler feed water heater $o$ and pipe $p$, whilst the solid matter in said residue is formed into press cakes in the filter and removed by a conveyor $u$ to a cake breaker $v$, thence by a conveyor $w$ to a drying machine at $x$, after which the dried and broken cake is conveyed by an elevator $y$ to an overhead bunker $z$ whence it is fed to the furnaces of boilers such as 11, 11. The flue gases from the boiler furnaces are led to the oven enclosing the pipes $d\ j$ and to the drying machine at $x$ as required and finally conveyed away by a chimney 12, whilst the steam generated in the boilers 11 is used partly to "cook" the sludge in one of the receptacles $f^1$, $f^2$ or $f^3$ and partly for steam engines for driving electric generators.

I claim:—

A process of treating sewage comprising passing sewage sludge in heat exchange relation with hot sludge discharging from a heating receptacle, introducing the preheated sludge into a second receptacle and heating the sludge therein at a pressure of about 100 pounds per square inch, conducting the hot sludge in heat exchange relation with fresh sludge flowing to a third receptacle, conveying the cooled sludge to a settling tank, decanting the supernatant liquid, subjecting the residue to the action of a mixer to mix intimately the fine and fibrous material, and then filtering the mixed suspension, the fibrous material in said residue thereby building up a superstructure during filtering which holds the fine material without such loss of porosity as to prevent the passage of the liquid.

WILLIAM KING PORTEOUS.